US009787080B2

(12) United States Patent
Luebke et al.

(10) Patent No.: US 9,787,080 B2
(45) Date of Patent: Oct. 10, 2017

(54) MICROGRID DISTRIBUTION MANAGER WITH DYNAMICALLY ADJUSTABLE TRIP CURVES FOR MULTI-SOURCE MICROGRIDS

(71) Applicant: EATON CORPORATION, Cleveland, OH (US)

(72) Inventors: Charles John Luebke, Hartland, WI (US); Thomas J. Schoepf, Stuttgart (DE)

(73) Assignee: EATON CORPORATION, Cleveland, OH (US)

( * ) Notice: Subject to any disclaimer, the term of this patent is extended or adjusted under 35 U.S.C. 154(b) by 484 days.

(21) Appl. No.: 14/572,041

(22) Filed: Dec. 16, 2014

(65) Prior Publication Data
US 2016/0172838 A1   Jun. 16, 2016

(51) Int. Cl.
*H02H 3/00* (2006.01)
*H02H 3/08* (2006.01)

(52) U.S. Cl.
CPC .............. *H02H 3/08* (2013.01); *H02H 3/006* (2013.01)

(58) Field of Classification Search
CPC ....................................... H02H 3/08
USPC ...................................... 361/93.1
See application file for complete search history.

(56) References Cited

U.S. PATENT DOCUMENTS

| | | | |
|---|---|---|---|
| 4,428,022 A | 1/1984 | Engel et al. | |
| 5,525,985 A | 6/1996 | Schlotterer et al. | |
| 5,910,760 A | 6/1999 | Malingowski et al. | |
| 6,144,271 A | 11/2000 | Mueller et al. | |
| 6,539,287 B1 * | 3/2003 | Ashizawa | H02H 7/263 361/59 |
| 8,447,435 B1 | 5/2013 | Miller et al. | |
| 8,497,599 B2 * | 7/2013 | Roscoe | H02J 3/38 307/69 |
| 8,861,162 B2 * | 10/2014 | Fuller | H01H 9/548 361/42 |
| 9,413,195 B2 * | 8/2016 | Luebke | H02J 3/14 |
| 9,667,056 B2 * | 5/2017 | Luebke | H02H 3/38 |
| 2016/0190790 A1 * | 6/2016 | Oudalov | H02H 3/006 361/66 |

* cited by examiner

*Primary Examiner* — Stephen W Jackson
(74) *Attorney, Agent, or Firm* — Eckert Seamans; Philip Levy; Grant Coffield

(57) ABSTRACT

A distribution manager for a power microgrid system includes a main bus, and a circuit breaker coupled to the main bus and to one of a load and an inter-microgrid connection system of the power microgrid system, the circuit breaker being structured to operate based on a set of functional trip settings. The distribution manager is structured and configured to: (i) determine an available source overcurrent that will be fed through the circuit breaker, (ii) determine a number of trip parameter settings based on at least the available source overcurrent, and (iii) set the functional trip settings of the circuit breaker based on the determined number of trip parameter settings.

21 Claims, 10 Drawing Sheets

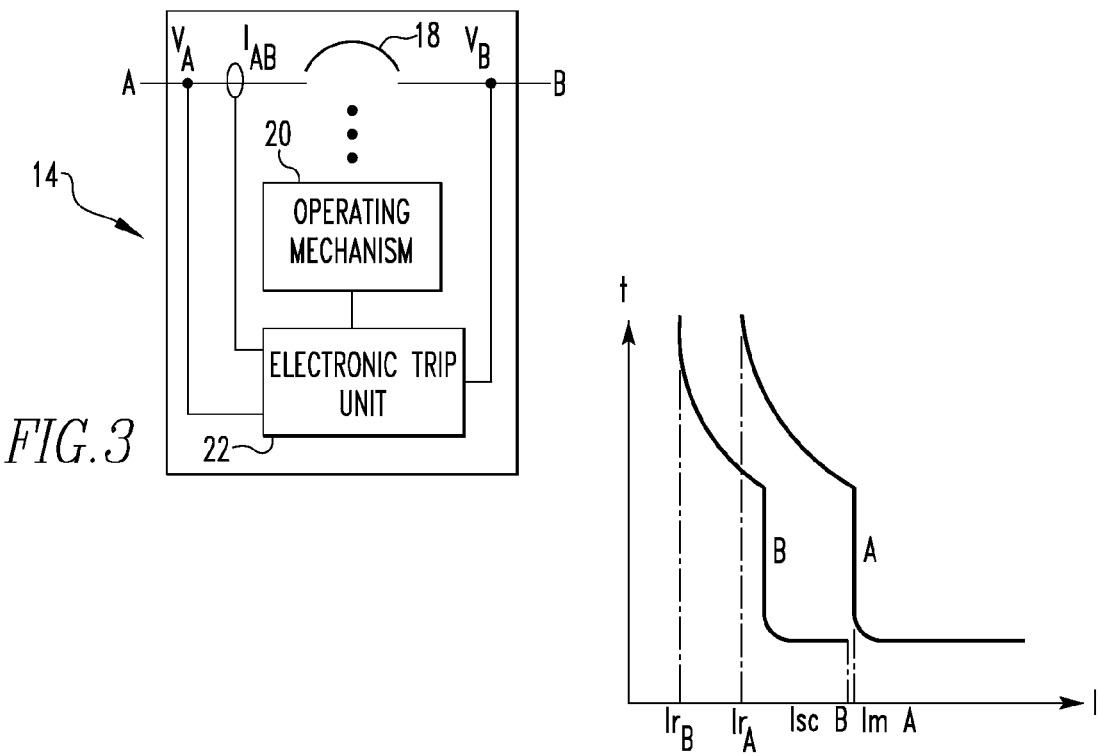
FIG.3
FIG.5
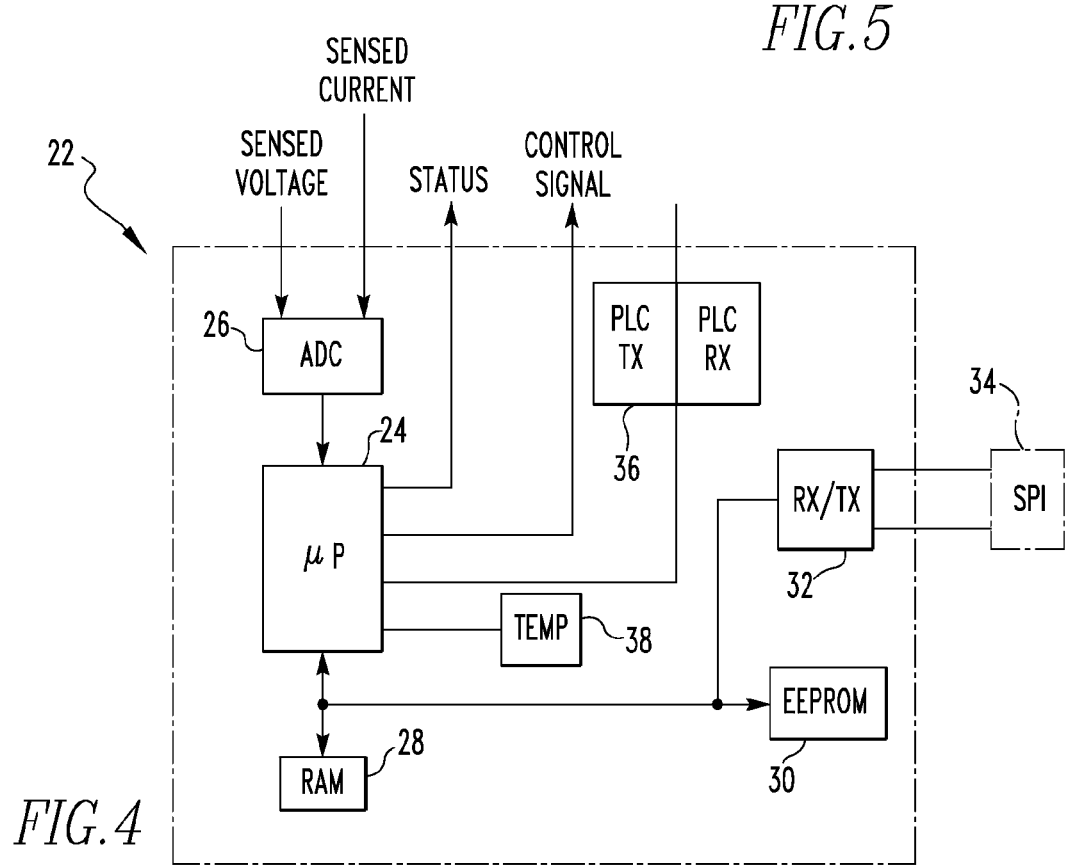
FIG.4

| | AVAILABLE SOURCE OVERCURRENT 1; SOURCE 1 | AVAILABLE SOURCE OVERCURRENT 2; SOURCE 2 | AVAILABLE SOURCE OVERCURRENT 3; SOURCE 3 | AVAILABLE SOURCE OVERCURRENT 4; SOURCE 4 | AVAILABLE SOURCE OVERCURRENT 5; SOURCE 5 | AVAILABLE SOURCE OVERCURRENT 6; SOURCE 6 |
|---|---|---|---|---|---|---|
| INTER-MICROGRID BREAKER | STANDARD (DEFAULT) | TRIP PARAMETER SETTINGS A | TRIP PARAMETER SETTINGS B | TRIP PARAMETER SETTINGS C | TRIP PARAMETER SETTINGS D | TRIP PARAMETER SETTINGS E |
| LOAD BREAKER-CRITICAL | STANDARD (DEFAULT) | TRIP PARAMETER SETTINGS F | TRIP PARAMETER SETTINGS G | TRIP PARAMETER SETTINGS H | TRIP PARAMETER SETTINGS I | TRIP PARAMETER SETTINGS J |
| LOAD BREAKER-NON-CRITICAL OR ENERGY STORAGE | STANDARD (DEFAULT) | TRIP PARAMETER SETTINGS K | TRIP PARAMETER SETTINGS L | TRIP PARAMETER SETTINGS M | TRIP PARAMETER SETTINGS N | TRIP PARAMETER SETTINGS O |

FIG. 7A

|  | > 1,000A;<br>UTILITY | 400-600A;<br>THREE DIESEL<br>GENERATORS | 400-600A;<br>THREE NATURAL<br>GAS GENERATORS | 100-300A;<br>ONE DIESEL<br>GENERATOR | 100-300A;<br>ONE NATURAL<br>GAS GENERATOR | 100-300A;<br>ONE PV INVERTER |
|---|---|---|---|---|---|---|
| INTER-MICROGRID<br>BREAKER | LDT : STD<br>SDPU : STD<br>INST : STD<br>SDT : STD | LDT : 55%STD<br>SDPU : 50%STD<br>INST : 50%STD<br>SDT : 40%STD | LDT : 65%STD<br>SDPU : 50%STD<br>INST : 50%STD<br>SDT : 40%STD | LDT : 30%STD<br>SDPU : 15%STD<br>INST : 15%STD<br>SDT : 40%STD | LDT : 16%STD<br>SDPU : 15%STD<br>INST : 15%STD<br>SDT : 40%STD | LDT : 8%STD<br>SDPU : 15%STD<br>INST : 15%STD<br>SDT : 15%STD |
| LOAD<br>BREAKER-CRITICAL | LDT : STD<br>SDPU : STD<br>INST : STD<br>SDT : STD | LDT : 55%STD<br>SDPU : 50%STD<br>INST : 50%STD<br>SDT : 40%STD | LDT : 65%STD<br>SDPU : 50%STD<br>INST : 50%STD<br>SDT : 40%STD | LDT : 30%STD<br>SDPU : 15%STD<br>INST : 15%STD<br>SDT : 40%STD | LDT : 16%STD<br>SDPU : 15%STD<br>INST : 15%STD<br>SDT : 40%STD | LDT : 8%STD<br>SDPU : 15%STD<br>INST : 15%STD<br>SDT : 40%STD |
| LOAD BREAKER-NON-CRITICAL<br>OR ENERGY STORAGE | LDT : STD<br>SDPU : STD<br>INST : STD<br>SDT : STD | LDT : 30%STD<br>SDPU : 33%STD<br>INST : 33%STD<br>SDT : 40%STD | LDT : 30%STD<br>SDPU : 33%STD<br>INST : 33%STD<br>SDT : 40%STD | LDT : 8%STD<br>SDPU : 15%STD<br>INST : 15%STD<br>SDT : 16%STD | LDT : 8%STD<br>SDPU : 15%STD<br>INST : 15%STD<br>SDT : 16%STD | LDT : 8%STD<br>SDPU : 15%STD<br>INST : 15%STD<br>SDT : 16%STD |

*FIG. 7B*

MICROGRID DISTRIBUTION MANAGER WITH DYNAMICALLY ADJUSTABLE TRIP CURVES FOR MULTI-SOURCE MICROGRIDS

BACKGROUND

Field

The disclosed concept pertains generally to microgrid systems, and, more particularly, to a multi-source microgrid system that includes one or more distribution manager having a number of smart circuit breakers wherein the trip curves of the circuit breakers can be dynamically adjusted based upon the available source overcurrent in a given direction that may be provided to (i.e., sourced through) a circuit breaker (and optionally on other criteria such as, without limitation, total available source overcurrent to a given conductor, size of the buss bar or interconnection cable, type of source or type/criticality of load).

Background Information

A distributed power source is a secondary power generation mechanism other than the primary utility feed used to provide an alternative to or an enhancement of the traditional electric power system. Distributed power sources include, for example and without limitation, photovoltaic (PV) systems, wind turbines, backup generators, energy storage, and uninterruptible power supplies.

A microgrid is a discrete energy system consisting of a number of distributed energy sources and loads capable of operating in parallel with, or independently from, the main grid. When connected to the main grid, a microgrid will rely on a mix of power generation sources depending on the metric to be optimized (cost, greenhouse gas emissions, reliability). In the case where the microgrid is operating independently from the main grid (e.g., when the point of common coupling with the main grid has been disconnected), the microgrid is typically said to be operating in an islanded mode.

Microgrids are desirable as the multiple dispersed generation sources of a microgrid and the ability to isolate the microgrid from a larger network generally provide highly reliable electric power. Typically, specialized hardware and software systems control the integration and management of the components of a microgrid and the connection to the main grid.

Circuit protection in microgrid type systems where multiple, current limited sources are feeding into a shared/common bus, and where multiple loads may be present (or added over time) could cause an overcurrent condition to occur where the sources cannot deliver adequate power to support the loads. Circuit breaker trip curves today are manually (statically) set to match the source or load they are protecting. However, when sources and loads change over time within a microgrid, it is necessary to dynamically adjust the trip curve to match the available source overcurrent from the source(s). As new sources or loads are plugged in or added over time at any power port on a microgrid system, there is the potential for overload currents to become present on the common bus. This is of particular concern for a power distribution topology that may evolve/change over time and allows for bidirectional power flow. Different policies or strategies based on different operating conditions and scenarios can also be performed with dynamically adjustable trip curves.

SUMMARY

In one embodiment, a distribution manager for a power microgrid system is provided that includes a main bus, and a circuit breaker coupled to the main bus and to one of a load and an inter-microgrid connection system of the power microgrid system, the circuit breaker being structured to operate based on a set of functional trip settings. The distribution manager is structured and configured to: (i) determine an available source overcurrent that will be fed through the circuit breaker, (ii) determine a number of trip parameter settings based on at least the available source overcurrent, and (iii) set the functional trip settings of the circuit breaker based on the determined number of trip parameter settings.

In another embodiment, a method of adjusting a circuit breaker of a distribution manager for a power microgrid system is provided, wherein the circuit breaker is coupled to a main bus of the distribution manager and to one of a source, a load and an inter-microgrid connection system of the power microgrid system. The circuit breaker is structured to operate based on a set of functional trip settings. The method includes determining an available source overcurrent that will be fed through the circuit breaker, determining a number of trip parameter settings based on at least the available source overcurrent, and setting the functional trip settings of the circuit breaker based on the determined number of trip parameter settings.

BRIEF DESCRIPTION OF THE DRAWINGS

A full understanding of the disclosed concept can be gained from the following description of the preferred embodiments when read in conjunction with the accompanying drawings in which:

FIG. 3 is a schematic diagram of a smart breaker forming part of the distribution manager of FIG. 2 according to an exemplary embodiment of the disclosed concept;

FIG. 4 is a schematic diagram of an electronic trip unit forming part of the smart breaker of FIG. 3 according to an exemplary embodiment of the disclosed concept;

FIG. 5 illustrates adjustment of the trip curve of the smart breaker of FIG. 3 according to an exemplary embodiment of the disclosed concept.

FIGS. 7A and 7B are examples of the type of information that may be used to dynamically adjust breaker trip curves according to various exemplary embodiments.

DESCRIPTION OF THE PREFERRED EMBODIMENTS

Figure 1:
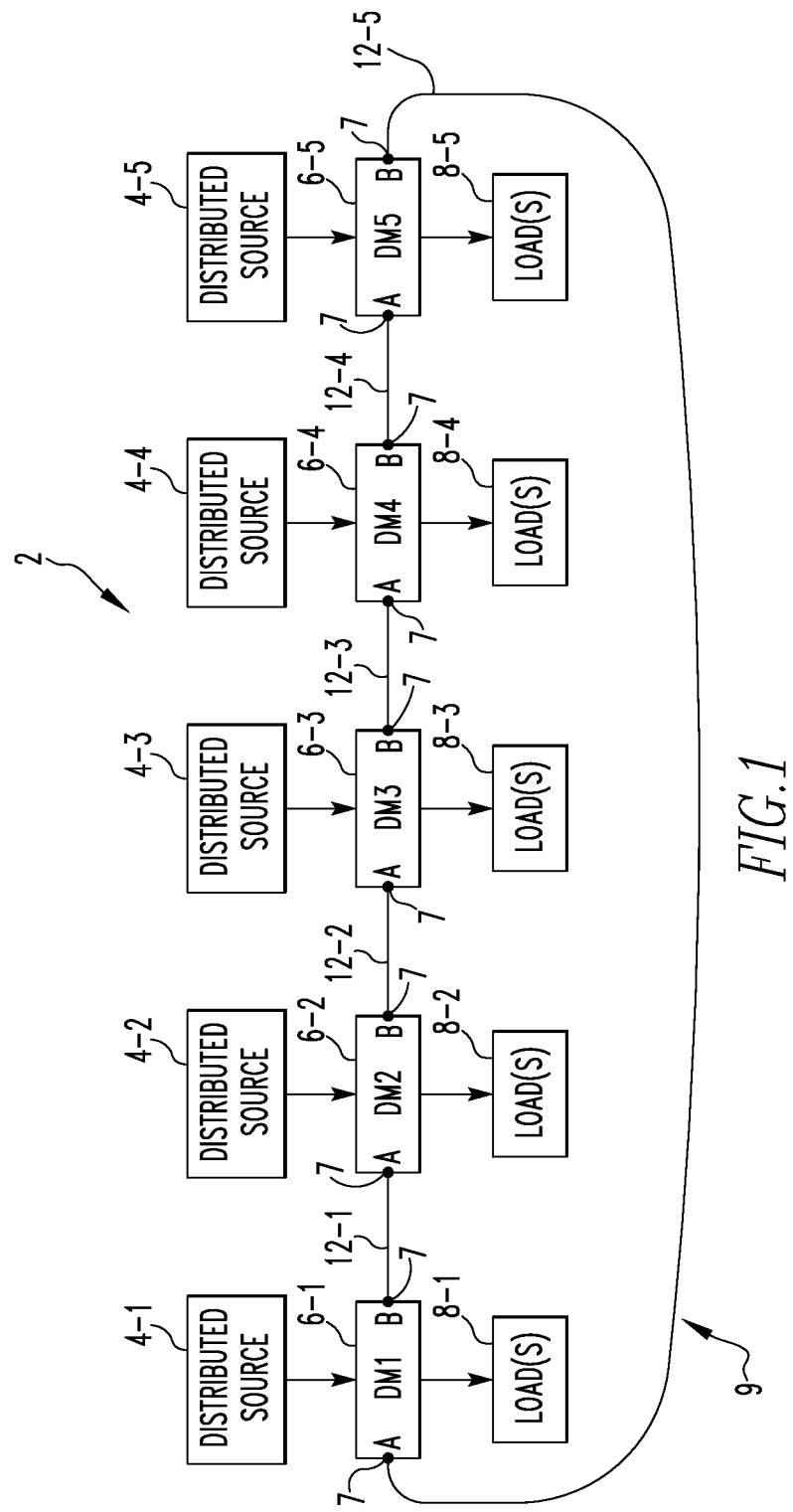
FIG. 1 is a schematic diagram of a microgrid system according to an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the term "available source overcurrent" shall mean the current delivered in a given direction through a circuit breaker from one or more sources during a short circuit condition.

As employed herein, the term "total available source overcurrent" shall mean the sum of the available source overcurrent(s) delivered to a given conductor from all sources during a short circuit condition.

As employed herein, the term "critical load" shall mean those loads where any loss of power would cause a significant loss in safety or production to a facility or equipment. In an aspect of an embodiment of the disclosed concept explained herein, for critical loads, smart breaker trip values would be set to match the total available source overcurrent in an attempt to ride through an overcurrent fault.

As employed herein, the term "non-critical load" shall mean those loads that are not critical loads. In an aspect of an embodiment of the disclosed concept explained herein, for non-critical loads, smart breaker trip values would be set lower than the source or inter-grid connection breaker trip values so the load breaker would trip before the source or inter-grid connection breakers.

FIG. 1 is a schematic diagram of a microgrid system 2 according to an exemplary embodiment of the disclosed concept. As described in greater detail herein, according to the disclosed concept, microgrid system 2 is structured and configured to dynamically adjust circuit breaker functional trip settings based on the available source overcurrent in a given direction that may be provided to (i.e., sourced through) a circuit breaker (and, optionally, on other criteria such as, without limitation, total available source overcurrent to a given bus conductor, size of the bus bar or interconnection cable, type of source or type/criticality of load).

Referring to FIG. 1, microgrid system 2 includes a number of distributed sources 4, wherein each distributed source 4 is, for example and without limitation, a photovoltaic (PV) inverter, a wind turbine, a backup generator, an energy storage module, or an uninterruptible power supply. In the exemplary embodiment shown in FIG. 1, microgrid system 2 includes five distributed sources 4 (labeled 4-1, 4-2, 4-3, 4-4, and 4-5). It will be understood, however, that that is meant to be exemplary only and that microgrid system 2 may include more than or less than five distributed sources 4 within the scope of the disclosed concept. In addition, as seen in FIG. 1, each distributed source 4 is operatively coupled to a distribution manager 6 (labeled 6-1, 6-2, 6-3, 6-4, and 6-5) that, as described herein, functions to control the flow of power in microgrid system 2. Furthermore, each distribution manager 6 is coupled to and feeds a number of loads 8 (labeled 8-1, 8-2, 8-3, 8-4, and 8-5).

In addition, in the illustrated embodiment, distribution managers 6-1, 6-2, 6-3, 6-4, and 6-5 are coupled together in a ring configuration by an inter-microgrid connection 9 comprising a number of ring conductors 12 (labeled 12-1, 12-2, 12-3, 12-4, and 12-5). In the non-limiting exemplary embodiment, microgrid system 2 is a three phase AC system and each ring conductor 12 includes separate conductors for each phase. It will be understood, however, that other configurations are also possible. In the exemplary ring configuration embodiment of FIG. 1, and as described elsewhere herein (FIG. 2), each distribution manager 6 has two ring bus connections 7, labeled A and B. As seen in FIG. 1, ring conductor 12-1 is provided between the ring bus connection 7-B of distribution manager 6-1 and the ring bus connection 7-A of distribution manager 6-2, ring conductor 12-2 is provided between the ring bus connection 7-B of distribution manager 6-2 and the ring bus connection 7-A of distribution manager 6-3, ring conductor 12-3 is provided between the ring bus connection 7-B of distribution manager 6-3 and the ring bus connection 7-A of distribution manager 6-4, ring conductor 12-4 is provided between the ring bus connection 7-B of distribution manager 6-4 and the ring bus connection 7-A of distribution manager 6-5, and ring bus conductor 12-5 is provided between the ring bus connection 7-B of distribution manager 6-5 and the ring bus connection 7-A of distribution manager 6-1. The inter-microgrid connection 9 is bidirectional in that it permits power flow to and from each distribution manager 6. Thus, each distribution manager 6 is capable of providing power to or receiving power from another distribution manager 6 depending on the instantaneous power needs and availabilities within microgrid system 2, with the direction of power flow being controlled in real time and near-instantaneously.

Moreover, while in the exemplary embodiment microgrid system 2 employs a ring bus configuration, it will be understood that other interconnection topologies, such as a serial bus configuration (daisy chain), and fan out configuration or a star configuration, or some combination thereof, or mesh are also possible within the scope of the disclosed concept.

Figure 2:
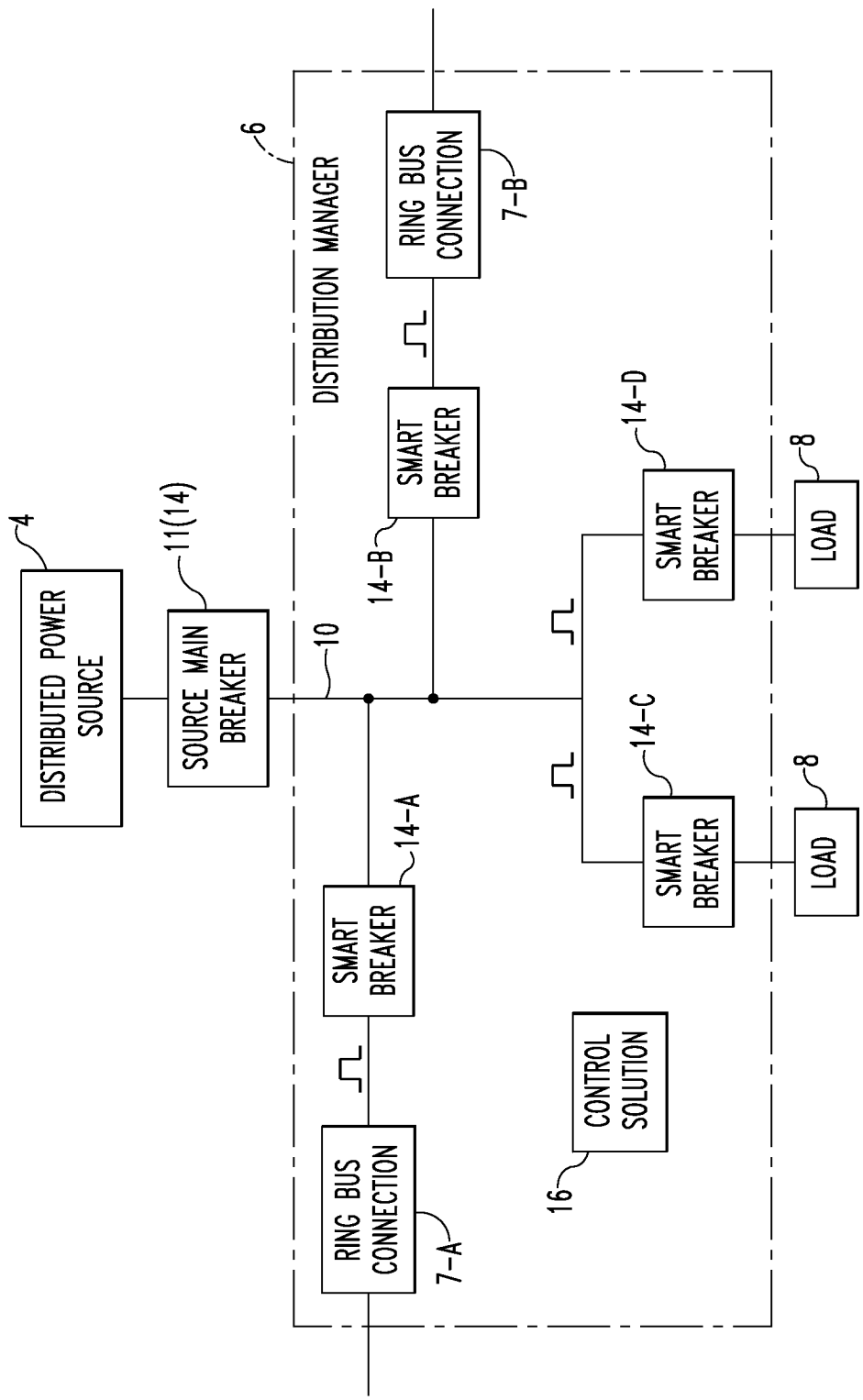
FIG. 2 is a schematic diagram showing a portion of the microgrid system of FIG. 1 with a more detailed schematic of the distribution manager thereof.

FIG. 2 is a schematic diagram showing a portion of microgrid system 2 with a more detailed schematic of distribution manager 6 according to an exemplary embodiment of the disclosed concept. As seen in FIG. 2, distribution manager 6 includes a main busbar 10, with distributed source 4 being coupled to main busbar 10 through a source main circuit breaker 11. In the exemplary embodiment, distributed source 4 may be selectively taken offline and selectively placed online by opening and closing source main circuit breaker 11 or via a command directly to distributed source 4 to turn on and off. As mentioned above, distribution manager 6 further includes ring bus connection 7-A and ring bus connection 7-B. Ring bus connection 7-A is electrically coupled to main busbar 10 through a smart breaker 14 (labelled 14-A), and similarly ring bus connection 7-B is electrically coupled to main busbar 10 through a smart breaker 14 (labelled 14-B). In addition, each load 8 is coupled to main busbar 10 through a respective smart breaker 14 (labelled 14-C and 14-D, respectively). Smart breaker 14 according to one exemplary embodiment is described below in connection with FIGS. 3 and 4. In one particular embodiment, source main circuit breaker 11 may also have the form and functionality of smart breaker 14. Also, each smart breaker 14 could be for a source or load or inter-microgrid connection depending on the wiring topology (bus, ring, star, mesh, daisy chain) and the power flow direction at a particular point in time. For example, an energy storage device connected via a smart breaker may be delivering power or being charged depending on the power sources and demands on the rest of the microgrid.

Finally, in the exemplary embodiment, distribution manager 6 includes a control solution 16 that provides a high level coordination function for distribution manager 6. For example, control solution 16 may be operatively coupled to and configured to control certain aspects of source main circuit breaker 11 and/or each of the smart breakers 14. In addition, according to an aspect of the disclosed concept, control solution 16 may also be configured to receive information via power line carrier (PLC) communications from other components of micro-grid system 2 (e.g., other distribution managers 6 or distributed sources 4) regarding the amount of current that is being provided to distribution manager 6 at any time (e.g., via ring bus connections 7-A and 7-B) as described in co-pending application Ser. No. 14/098,727, the disclosure of which is incorporated herein by reference. Control solution 16 may include any suitable processing device (such as a microprocessor or microcontroller) and an associated memory. For ease of illustration and clarity, the actual electrical connections between control solution 16 and source main circuit breaker 11 and each of the smart breakers 14 are not shown.

In the non-limiting exemplary embodiment, each smart breaker 14 is a configurable circuit interrupter (such as a molded case circuit breaker (MCCB) with a dynamically adjustable trip curve having the structure shown in FIGS. 3 and 4 (described below). Smart breakers 14 are configured to protect microgrid system 2 from damage due to an overcurrent condition. Referring to FIG. 3, smart breaker 14 includes separable contacts 18, an operating mechanism 20 structured to open and close separable contacts 18, and an electronic trip unit 22 which cooperates with operating mechanism 20 to trip open separable contacts 18. Current and voltage sensors between the A and B terminals provide signal inputs to electronic trip unit 22.

FIG. 4 is a schematic diagram showing certain selected components of electronic trip unit 22 according to the exemplary embodiment. As seen in FIG. 4, electronic trip unit 22 includes a microprocessor (g) 24 which controls the operating mechanism 20 via a control signal. Alternatively, microprocessor 24 may be another type of processing or control unit, such as, without limitation, a microcontroller or some other suitable processing device. Electronic trip unit 22 further includes an analog-to-digital converter (ADC) 26, a random access memory (RAM) 28 and an EEPROM 30, each of which is coupled to microprocessor 24. ADC 26 is structured to receive signals, such as a number of current signals (indicating the current of the circuit to which smart breaker 14 is connected) and voltages (indicating the voltage of the circuit for each side of the smart breaker 14), that are sensed by sensors (not shown; e.g., a number of current transformers or Rogowski coils) forming part of smart breaker 14 and convert those signals to digital data that is appropriate for microprocessor 24. As will be appreciated, that data may be stored in RAM 28 and/or used by the trip unit program implemented in and run by microprocessor 24 in determining whether and when to issue a trip signal for tripping operating mechanism 20. As described in greater detail herein, that data (e.g., current data) may also be used by microprocessor 24 (as a trigger) to cause smart breaker 14 to generate and transmit one or more signals (via PLC communications in the exemplary embodiment as described below) to other components of microgrid system 2 in order to cause certain actions to occur which may alleviate a detected overcurrent condition.

In addition, in the exemplary embodiment, EEPROM 30 stores (in nonvolatile memory) the functional trip settings of electronic trip unit 22 which define the operating characteristics of thereof, and which are read into microprocessor 24 as needed by the trip unit program. For example, and without limitation, the functional trip settings may include any of the following trip parameters: (i) continuous current setting (Ir), which is the maximum current that a circuit interrupter is configured to carry without tripping, and which may be specified in amps or as a percentage or fraction (e.g., 1.0, 0.95, 0.9, 0.8, 0.75, 0.7, 0.6, 0.5) of the continuous current rating or capacity (In) of the circuit interrupter; (ii) long delay pickup (LDPU), which specifies the current at which a long delay trip will be caused to occur, and which is typically a small overload or multiple of Ir (e.g., 110% of Ir); (iii) long delay time (LDT), which is the time (typically in seconds (e.g., (2, 4, 7, 10, 12, 15, 20, 24)) that the circuit interrupter is configured to carry the long delay pickup current (or greater) before tripping; (iv) short delay pickup (SDPU), which specifies the current at which a short delay trip will be caused to occur, and which is typically a multiple of Ir (e.g., 2×, 3×, 4×, 5×, 6×, 7×, 8×, 10×); (v) short delay time (SDT), which is the time (typically in milliseconds (e.g., 100, 200, 300, 400, 500)) that the circuit interrupter is configured to carry the short delay pickup current (or greater) before tripping; (vi) instantaneous pickup (IPU), which is the maximum current that the breaker circuit interrupter is configured to carry before instantly tripping (typically in multiples of In (2×, 3×, 4×, 6×, 8×, 10×, 12×)); (vii) ground fault pickup (GFPU), which specifies the ground current at which a ground fault trip will be caused to occur, and which is typically a fraction of In (e.g., 1.0, 0.75, 0.6, 0.5, 0.4, 0.35, 0.3, 0.25); (viii) ground fault delay time (GFT), which is the time (typically in seconds (0.1, 0.2, 0.3, 0.4, 0.5) that a circuit interrupter will allow a ground fault current (Ig times Ir) equal to or greater than the ground fault pickup before tripping; and (ix) maintenance mode (MM), which is expressed in multiples of Ir (off, 2, 4, 6, 8, 10) and which, if not in "off", will instantly trip a circuit interrupter when a current level (mm times Ir) is met regardless of other pickups and times.

Temperature input 38 can be used by the microprocessor 24 to provide temperature compensation for the trip curve. Electronic trip unit 22 also includes a communication interface 32 coupled to a serial port interface (SPI) 34, which in turn is operatively coupled to microprocessor 24 to allow for serial communication with microprocessor 24. This can provide a means to remotely communicate and display to indicate the percent current present on the conductor or busbar including an overload condition and impending trip. Finally, electronic trip unit 22 further includes a power line carrier (PLC) transceiver 36 coupled to the circuit to which smart breaker 14 is connected. PLC transceiver 36 is also coupled to microprocessor 26. PLC transceiver 36 is structured and configured to enable smart breaker 14 to communicate with other components of microgrid system 2 using PLC output signals (comprising a number of pulses). One capability of smart breaker 14 is that each section of its trip curve (i.e., functional trip settings) may be dynamically adjusted separately/independently (in response to signals received via PLC transceiver 36) as demonstrated in FIG. 5, wherein trip curve A is a default trip curve and trip curve B is a downwardly adjusted trip curve.

Referring again to FIG. 2, according to an aspect of the disclosed concept, control solution 16 stores a database of information for use in dynamically adjusting the functional trip settings (e.g., trip curves) of the smart breakers 14 based on the available source overcurrent in a given direction that may be provided to (i.e., sourced through) that smart breaker 14 at any given time (and, optionally, also based on certain other criteria such as, without limitation, total available source overcurrent to a given conductor, size of the bus bar or interconnection cable, type of source, or type/criticality of load). In particular, in the exemplary embodiment, control solution 16 will store (in a suitable memory), for each different breaker type present in distribution manager 6 (e.g., a source main breaker 11, an inter-microgrid smart breaker 14-A or 14-B, a critical load smart breaker 14-C or 14-D, or a non-critical load smart breaker 14-C or 14-D) the following information: (i) a plurality of available source overcurrent values or ranges and, optionally, associated source types providing the available source overcurrent, and (ii) the particular trip parameter settings (for one or more particular trip parameters such as, for example and without limitation, one or more of the parameters that are described elsewhere herein) to be employed therewith for the breaker in question. An example of such information according to one non-limiting, embodiment is shown in the table of FIG. 7A. As seen in FIG. 7A, this example specifies, for each of three different breaker types (inter-microgrid, critical load and non-critical load), six different particular trip parameter settings (each associated with an available source overcurrent value and source type). In addition, FIG. 7B is a table showing one particular implementation of the table of FIG. 7A according to a particular, non-limiting exemplary embodiment. In the table of FIG. 7B, the exemplary trip parameters that are adjusted are LDT, SDPU, INST, and SDT, although it will be understood that this is meant to be exemplary only and that other parameter combinations may also be employed.

Figure 6:
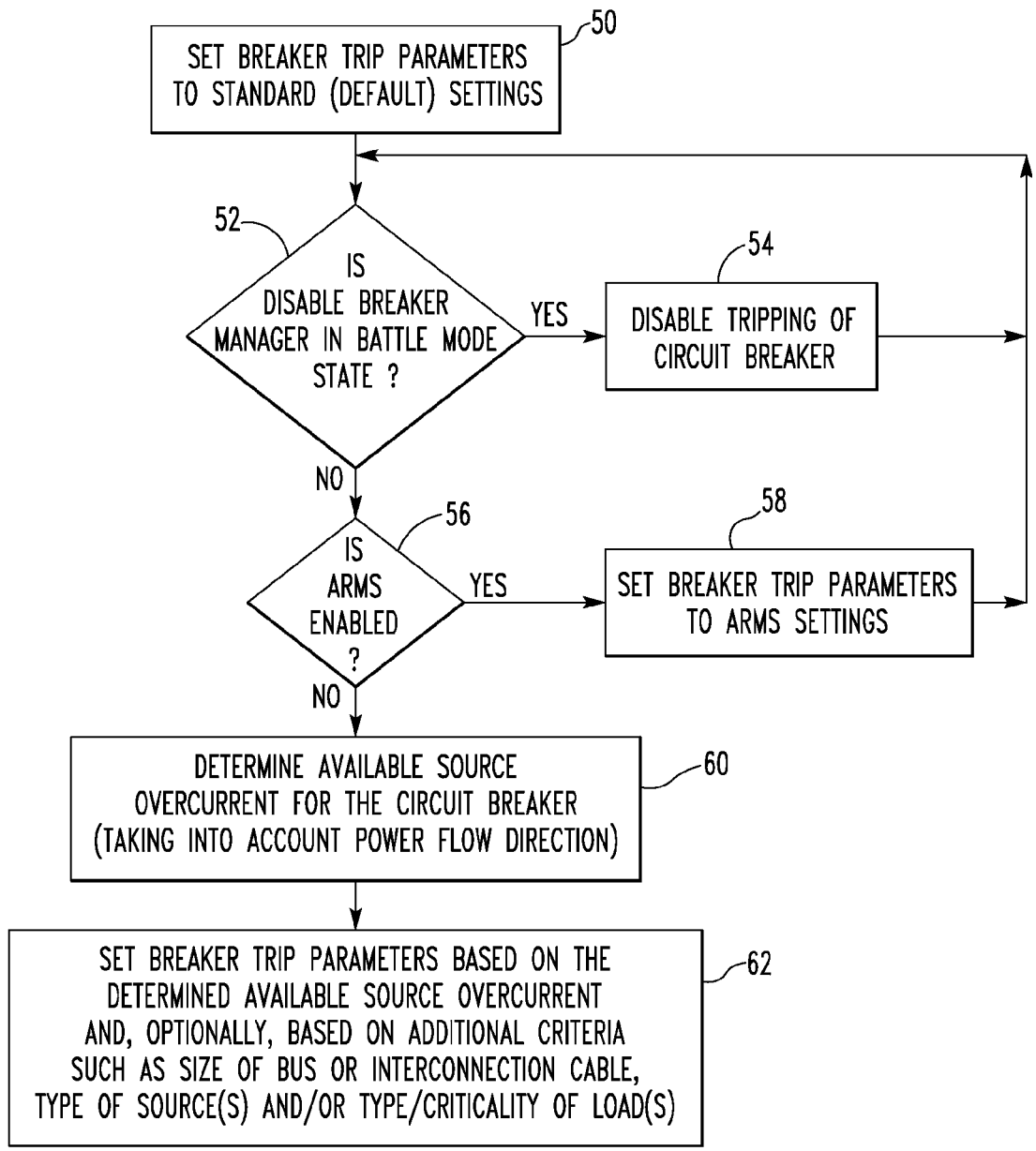
FIG. 6 is a flowchart illustrating a method of dynamically adjusting circuit breaker trip curves according to an exemplary embodiment.

Operation of microgrid system 2 according to the disclosed concept will now be described in connection with the flowchart of FIG. 6, which shows a method of operation according to one non-limiting, exemplary embodiment. The method of FIG. 6 is implemented in one or more routines executable by control system 16 and is, in the exemplary embodiment, performed in each distribution manager 6 for each of a source main breaker 11, the inter-microgrid breakers 14-A and 14-B and each of the load breakers 14-C and 14-D to dynamically adjust the trip parameters thereof. Control solution 16 could also be distributed and integrated within each smart breaker 14. The method begins at step 50, wherein the breaker trip parameters are initially set to a standard (default) setting (e.g., a utility setting). Then, at step 52, a determination is made as to whether distribution manager 6 is currently in a battle mode state. As is known in the art, in a battle mode state, breaker settings may be increased or even bypassed to assure power availability at the risk of overheating conductors. If the answer at step 52 is yes, then, at step 54, the tripping of the breaker is disabled and the method returns to step 52. If, however, the answer at step 52 is no, then the method proceeds to step 56. At step 56, a determination is made as to whether an arc reduction maintenance system (ARMS) in distribution manager 6 is enabled. As is known in the art, an ARMS can improve safety by providing a simple and reliable method to reduce fault clearing time by using a separate analog trip circuit to provide faster interruption times. If the answer at step 6 is yes, then, at step 58, the trip parameters of the breaker are set to certain predetermined ARMS settings. If the answer at step 56 is no, then the method proceeds to step 60. At step 60, the available source overcurrent for the circuit breaker is determined, taking into account power flow direction through the circuit breaker 14. The available source overcurrent for the breaker will be the sum of the available source overcurrent from all sources that may provide current through the circuit breaker in a given direction. As noted elsewhere herein, this information may be acquired by control system 16 by way of PLC communications with the other components of micro-grid system 2 (e.g., form distributed sources 4) as necessary. Following step 60, the method proceeds to step 62, wherein the breaker trip parameters for the circuit breaker are set based on the available source overcurrent determined in step 60 and, optionally, based on certain other additional criteria such as, without limitation, total available source overcurrent to a given conductor, size of bus bar or interconnection cable, type of source(s) and/or type/criticality of load. As described elsewhere herein, the particular trip parameter settings to be used in step 62 are determined by information stored by control system 16, such as, without limitation, the information as shown in FIGS. 7A and 7B.

Figure 8A:
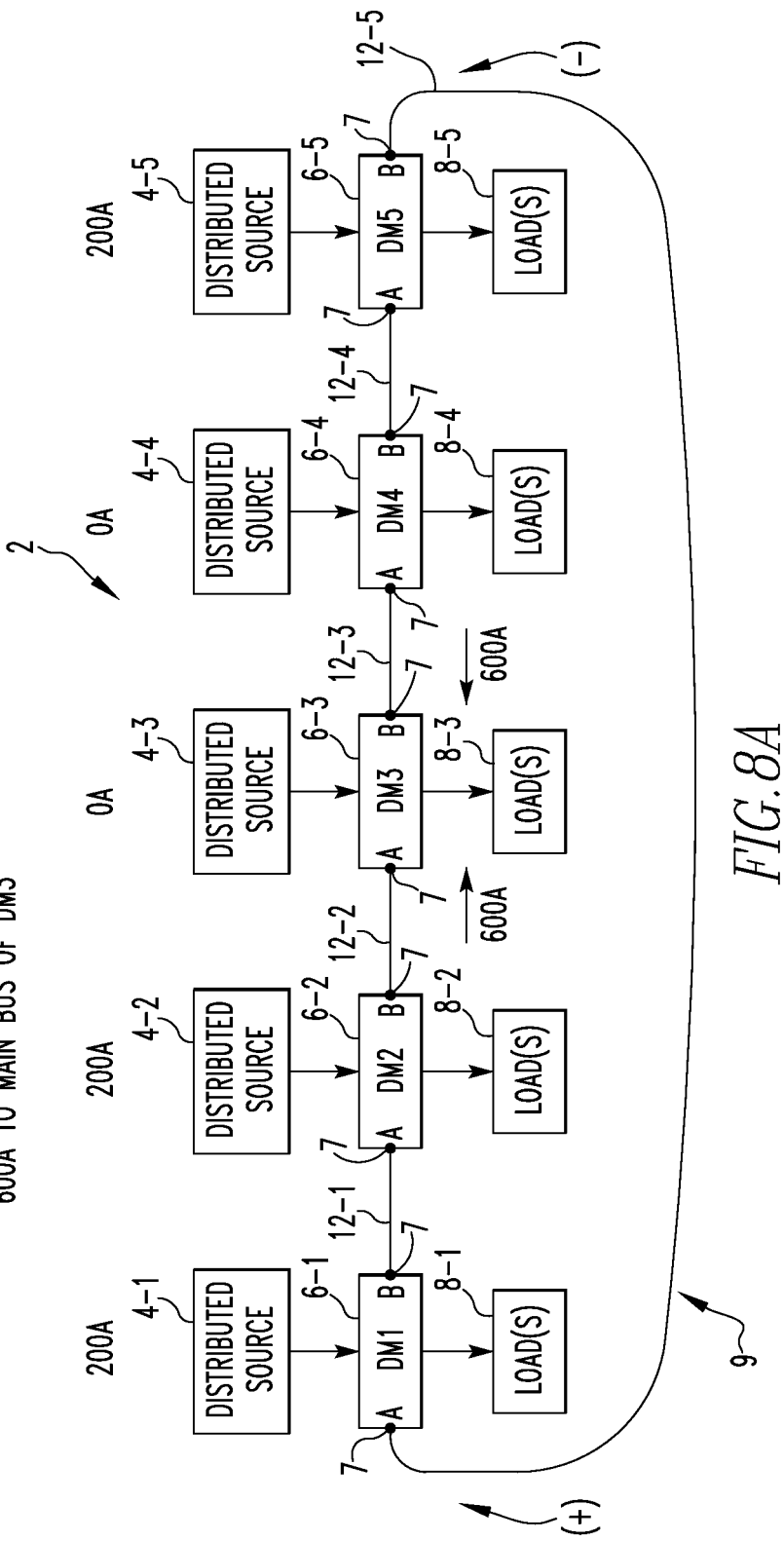
FIGS. 8A and 8B and 9A and 9B are schematic diagrams showing two different example implementations of the disclosed concept.
Figure 8B:
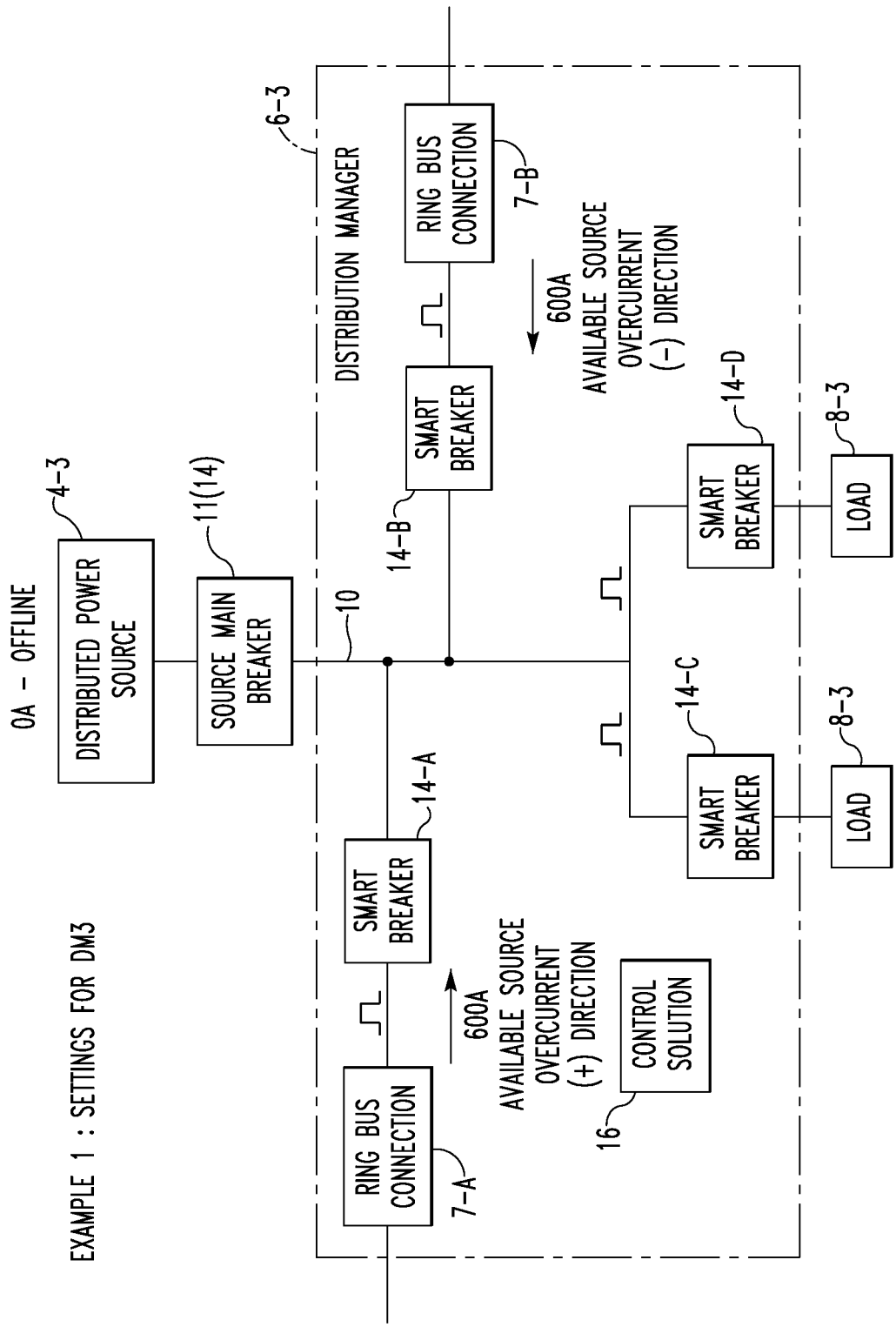

One example of the disclosed concept is shown in FIGS. 8A and 8B. In this example, assume that distributed sources 4-1, 4-2 and 4-5 are each a 200A single diesel generator, and that distributed sources 4-3 and 4-4 are currently off-line. In such a situation, source main breaker 11 of distribution manager 6-3 would be set for the off-line distributed source 4-3 (e.g., another 200A single diesel generator) that is structured to source that distribution manager 6-3. However, the available source overcurrent for the inter-microgrid connection system 9 including the ring conductor 12 would be 600A. According to the disclosed concept, the trip parameter settings of smart breakers 14-A and 14B would be set to values that correspond to the determined 600A available source overcurrent. In addition, as noted herein, this value may be reduced by additional criteria to provide adequate protection (e.g., without limitation, the size of the bus bar or interconnection cable, the type of source, etc.).

Figure 9A:
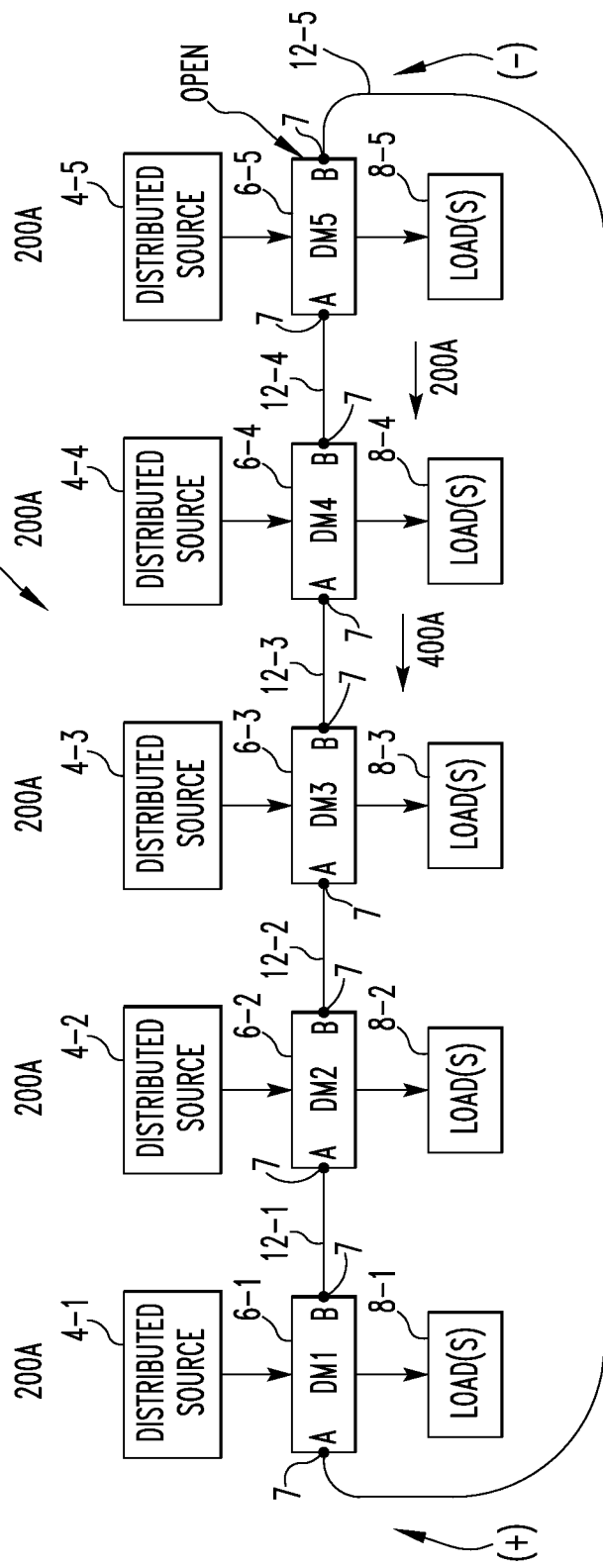
Figure 9B:
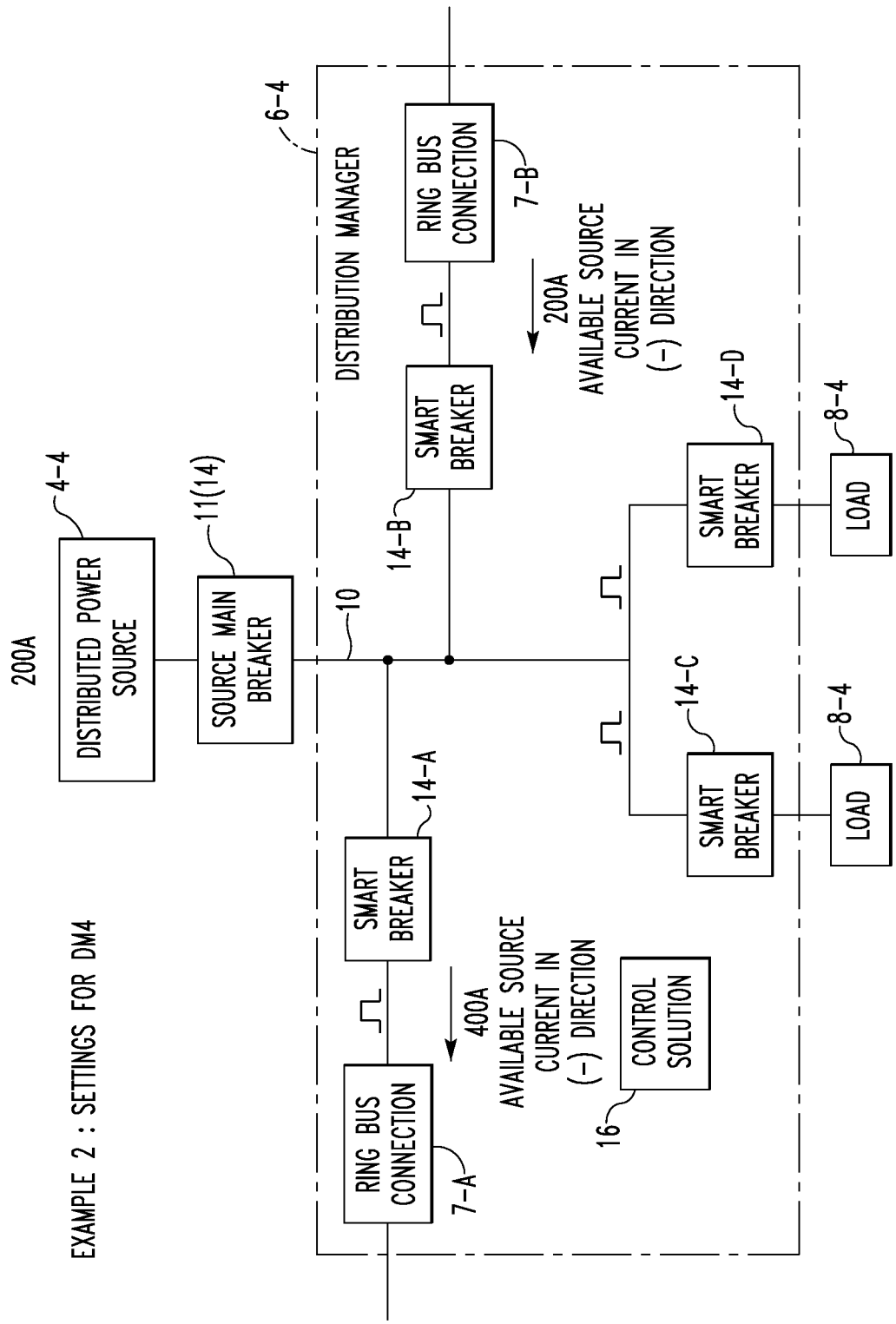

As another example of the disclosed concept is shown in FIGS. 9A and 9B. In this example, assume that all of the distributed sources 4-1, 4-2, 4-3, 4-4 and 4-5 are online and that each a 200A single diesel generator, that ring bus connection 7-B of distribution manager 6-5 is opened to prevent power flow through conductor 12-5, and that 1000A is being delivered to the main bus 10 of distribution manager 6-3. In distribution manager 6-4 in this example, the available source overcurrent through smart breaker 14-A thereof becomes 400A while the available source overcurrent through smart breaker 14-B thereof becomes 200A and the trip parameter settings of smart breakers 14-A and 14B would be set to those respective values.

Thus, in the various embodiments described herein, an improved microgrid system is provided that employs a number of distribution managers that are each structured and configured to dynamically adjust the trip curves of the distribution manager circuit breakers based upon the total available source overcurrent feeding a given bus conductor (and, optionally, on other criteria such as, without limitation, size of the bus bar or interconnection cable, type of source or type/criticality of load).

A further aspect of the disclosed concept relates to dynamically adjusting trip curve settings of a breaker, such as breakers 14 described herein, for Low Voltage Ride Thru (LVRT) protection requirements. Basically if the load current in an islanded microgrid, such as microgrid system 2, becomes greater than the "soft" current limited distributed sources can deliver, the voltage in the islanded microgrid will collapse. Ideally, breakers, such as breakers 14 in distribution manager 6, should have settings to stay closed (ride through) during an overload current condition if it is temporary (i.e. motor inrush), but open if it is a sustained short circuit fault. The previous embodiments described above relate to dynamically adjustable trip curve settings based on current. If a voltage sensor is also present, it is possible to add an additional trip curve based on voltage. The LVRT protection function exists today in protective relays, however the trip setting is static. Thus, according to an aspect of the disclosed concept, the LVRT settings of a breaker, such as breakers 14 in distribution manager 6, can be dynamically adjusted based on total available source overcurrent of a given conductor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A distribution manager for a power microgrid system, comprising:
   a main bus; and
   a circuit breaker coupled to the main bus and to one of a load and an inter-microgrid connection system of the power microgrid system, the circuit breaker being structured to operate based on a set of functional trip settings;
   wherein the distribution manager is structured and configured to: (i) determine an available source overcurrent that will be fed through the circuit breaker, (ii) determine a number of trip parameter settings based on at least the available source overcurrent, and (iii) set the functional trip settings of the circuit breaker based on the determined number of trip parameter settings.

2. The distribution manager according to claim 1, wherein the distribution manager is structured and configured to determine the number of trip parameter settings based on the available source overcurrent and one or more of (i) a total available source overcurrent of a conductor, (ii) a size of a bus bar coupled to the circuit breaker, (iii) one or more types of sources feeding the distribution manager, (iv) one or more types of loads coupled to the circuit breaker.

3. The distribution manager according to claim 1, wherein the circuit breaker is an inter-microgrid circuit breaker coupled to the main bus and to the inter-microgrid connection system.

4. The distribution manager according to claim 1, wherein the circuit breaker is a load circuit breaker coupled to the main bus and to the load.

5. The distribution manager according to claim 1, wherein the circuit breaker is a source main circuit breaker coupled to the main bus.

6. The distribution manager according to claim 1, wherein the circuit breaker is an inter-microgrid circuit breaker coupled to the main bus and to the inter-microgrid connection system, wherein the distribution manager further includes a load circuit breaker coupled to the main bus and to the load, the load circuit breaker being structured to operate based on a set of second functional trip settings, wherein the distribution manager is further structured and configured to: (i) determine a second available source overcurrent that will be fed through the load circuit breaker, (ii) determine a number of second trip parameter settings based on at least the available source overcurrent, and (iii) set the second functional trip settings of the load circuit breaker based on the determined number of second trip parameter settings.

7. The distribution manager according to claim 1, wherein the distribution manager is structured and configured to determine the available source overcurrent based on a number of signals received by the distribution manager.

8. The distribution manager according to claim 6, wherein each of the number of signals is a power line carrier signal.

9. The distribution manager according to claim 1, wherein the inter-microgrid connection system is a ring bus.

10. The distribution manager according to claim 1, wherein a control function of the circuit breaker is configured to perform (i), (ii) and (iii).

11. A microgrid system employing the distribution manager, the inter-microgrid connection system, and the load of claim 1.

12. A method of adjusting a circuit breaker of a distribution manager for a power microgrid system, the circuit breaker being coupled to a main bus of the distribution manager and to one of a source, a load and an inter-microgrid connection system of the power microgrid system, the circuit breaker being structured to operate based on a set of functional trip settings, the method comprising:
   determining an available source overcurrent that will be fed through the circuit breaker;
   determining a number of trip parameter settings based on at least the available source overcurrent; and
   setting the functional trip settings of the circuit breaker based on the determined number of trip parameter settings.

13. The method according to claim 12, wherein determining the number of trip parameter settings is based on the available source overcurrent and one or more of (i) a total available source overcurrent of a conductor, (ii) a size of a bus bar coupled to the circuit breaker, (iii) one or more types of sources feeding the distribution manager, (iv) one or more types of loads coupled to the circuit breaker.

14. The method according to claim 12, wherein the circuit breaker is an inter-microgrid circuit breaker coupled to the main bus and to the inter-microgrid connection system.

15. The method according to claim 12, wherein the circuit breaker is a load circuit breaker coupled to the main bus and to the load.

16. The method according to claim 12, wherein the circuit breaker is a source main circuit breaker coupled to the main bus.

17. The method according to claim 12, wherein the circuit breaker is an inter-microgrid circuit breaker coupled to the main bus and to the inter-microgrid connection system, wherein the distribution manager further includes a load circuit breaker coupled to the main bus and to the load, the load circuit breaker being structured to operate based on a set of second functional trip settings, and wherein the method further comprises determining a second total available source overcurrent that will be fed through the load circuit breaker, determining a number of second trip parameter settings based on at least the total available source overcurrent, and setting the second functional trip settings of the load circuit breaker based on the determined number of second trip parameter settings.

18. The method according to claim 12, wherein the determining the available source overcurrent is based on a number of signals received by the distribution manager.

19. The method according to claim 18, wherein each of the number of signals is a power line carrier signal.

20. The distribution manager according to claim 1, wherein the set of functional trip settings are Low Voltage Ride Thru settings.

21. The method according to claim 12, wherein the set of functional trip settings are Low Voltage Ride Thru settings.

* * * * *